DIFFERENTIAL CAPSTAN ASSEMBLY

Filed Aug. 29, 1963 3 Sheets-Sheet 1

INVENTOR:
Frank Dekker
By Smyth, Roston & Pavitt
Attorneys

Sept. 21, 1965 F. DEKKER 3,207,399

DIFFERENTIAL CAPSTAN ASSEMBLY

Filed Aug. 29, 1963 3 Sheets-Sheet 2

INVENTOR:
Frank Dekker

By Smyth, Roston & Pavitt
Attorneys

DIFFERENTIAL CAPSTAN ASSEMBLY

Filed Aug. 29, 1963 3 Sheets-Sheet 3

INVENTOR:
Frank Dekker
By Smyth, Roston & Pavitt
Attorneys 3,207,399

DIFFERENTIAL CAPSTAN ASSEMBLY

Frank Dekker, Inglewood, Calif., assignor to Minnesota Mining and Manufacturing Company, St. Paul, Minn., a corporation of Delaware Filed Aug. 29, 1963, Ser. No. 305,413
14 Claims. (Cl. 226—51)

This invention relates to a tape transport mechanism and, more particularly, relates to such a mechanism for placing a portion of a traveling tape under tension in the region of a transducing station.

A prevalent type of tape transport mechanism comprises a drive capstan, an idler capstan cooperative with the drive capstan to form the traveling tape into a loop and two pucks for resilient nip-rollers to press the two legs of the traveling tape against the drive capstan. For the purpose of placing the loop under the requisite tension two different axial portions of the drive capstan are of different diameters for different peripheral speeds and the two nip-rollers press the tape against the two portions respectively.

Such a tape transport mechanism serves its purpose but has the disadvantage of setting up lines of tension in the tape that are not parallel with the axis of the tape. In the usual arrangement, two lines of tension diverge in opposite direction and theoretically balance each other to produce a resultant force along the axis of the tape out in actual practice it is exceedingly difficult if not impossible to achieve exact balance.

Another disadvantage is the distortion of the tape arising from the necessity of the tape accommodating itself to the two different diameters of the drive capstan, the tape being distorted in one respect as it makes its first contact with the drive capstan and then being distorted in the opposite respect as it makes its second contact with the drive capstan.

A high speed tape transport system is inherently vulnerable to numerous unavoidable disturbances arising from diverse causes including disturbances originating in the two reels and disturbances created by minute defects in bearings as well as disturbances created by the resiliency of the tape itself especially in making changes in direction. Special attention must be paid to all of these sources of trouble to achieve a requisite high degree of accuracy in recording and especially in reproducing signals and added measures become necessary if the traveling tape is subjected to diverging lines of tension and rapidly reversed lateral distortions.

The present invention avoids these added difficulties by subjecting the traveling tape solely to lines of uniform tension parallel with the tape and by engaging the tape only with uniform circumferential surfaces. This end is achieved by using two separate drive capstans of uniform diameter to form the traveling tape into a loop with the leading capstan driven at a higher peripheral speed than the trailing capstan thereby to place the tape under the desired tension.

One problem in carrying out this concept is to provide absolute assurance that a given constant speed differential will prevail between the two peripheral capstan speeds. The above described prior art arrangement inherently provides such assurance because the two tape-engaging surfaces for placing the tape under tension are integral parts of a single drive capstan. The present invention meets this problem by driving the two capstans by means of a single rotary drive member, suitable idle rollers retractably frictionally engaging the rotary drive member and the two capstans.

In one practice of the invention the speed differential of the two drive capstans is achieved by providing two circumferential drive surfaces of two different diameters on each of the two drive capstans for cooperation with the rotary drive member, the rotary drive member having a single cooperating circumferential surface of uniform diameter. In a second practice of the invention the speed differential is achieved by providing the rotary drive member with two circumferential surface of different diameters and providing each of the two capstans with a single cooperating circumferential surface of uniform diameter. It is to be noted, however, that both practices of the invention differ from the previously described prior art arrangement in that they completely divorce the differential circumferential surfaces from the traveling tape.

The features and advantages of the invention may be understood from the following detailed description considered with the accompanying drawings.

In the drawings, which are to be regarded as merely illustrative:

FIG. 1 is a diagrammatic view showing how two drive capstans cooperate with two idler rollers to form a tensioned loop in a traveling tape;

FIG. 1*a* is a similar view on a reduced scale showing how the two capstans and idler rollers of FIG. 1 are associated with a pair of reels or the tape;

Figures 1, 1A, 2, 3, 4, 5:
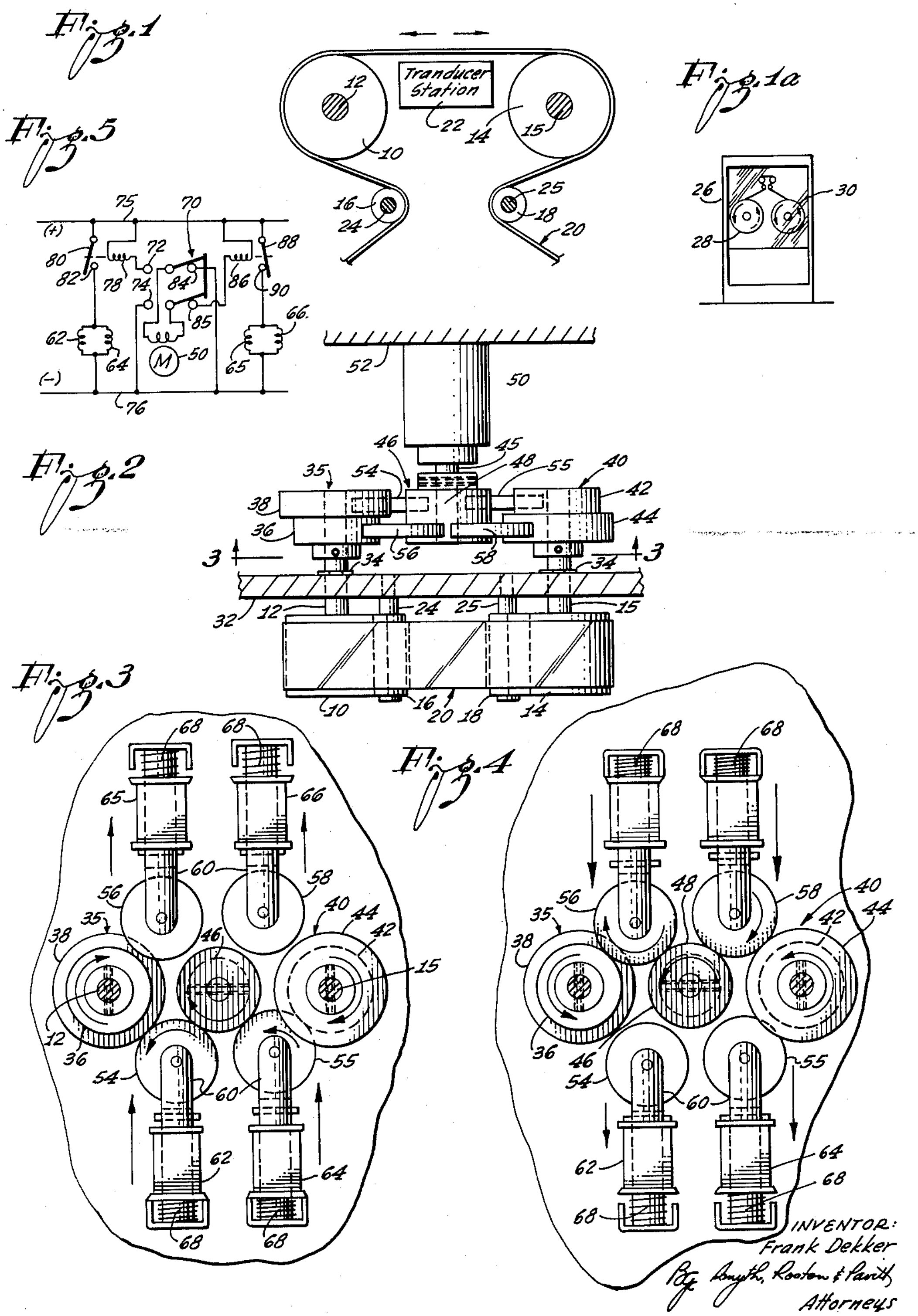
FIG. 2 is an elevational view of the tape transport mechanism with the solenoids omitted for clarity of illustration.
FIG. 3 is a view partly in section as seen along the line 3—3 of FIG. 2 showing the tape transport mechanism in operation to drive the tape in one direction.
FIG. 4 is a similar view showing the mechanism in operation to drive the tape in the opposite direction.
FIG. 5 is a wiring diagram of a control for the tape transport mechanism.

FIG. 1 shows how a first drive capstan 10 fixedly mounted on a drive shaft 12 and a second drive capstan 14 fixedly mounted on a second drive shaft 15 may cooperate with a pair of idler rollers 16 and 18 to form a magnetic tape 20 into a loop for travel past a transducer station 22 under suitable tension. The two idler rollers 16 and 18 which are mounted on corresponding spindles 24 and 25 guide the traveling tape with reference to a pair of corresponding reels. Thus FIG. 1*a* shows how the tape transport mechanism may be mounted in a housing 26 with the tape wound on two reels 28 and 30 which serve as supply reels and take-up reels in accord with the direction of travel of the tape.

FIG. 2 shows how the two spindles 24 and 25 may be fixedly mounted on a panel 32 and further shows how the two drive shafts 12 and 15 may extend through the panel and be journaled in suitable bearings 34 in the panel. Fixedly mounted on the drive shaft 12 behind the panel 32 is a circular body 35 having a circumferential drive surface 36 of relatively small diameter and a circumferential drive surface 38 of relatively large diameter. In like manner, a circular body 40 fixedly mounted on the second drive shaft 15 has a circumferential drive surface 42 of relatively small diameter and a circumferential drive surface 44 of relatively large diameter. It is to be noted that the two drive surfaces 38 and 42 lie in the same plane perpendicular to the axes of the two drive shafts and the two circumferential drive surfaces 36 and 44 lie in a second plane perpendicular to the axes of the two drive shafts.

A third drive shaft 45 parallel to the two drive shafts 12 and 15 and positioned between the two drive shafts carries a rotary drive member 46 having a relatively wide circumferential drive surface 48 that extends through both of the above mentioned planes. In the construction shown the drive shaft 45 is the shaft of a suitable reversible motor 50 that is mounted by one end on a suitable fixed support 52.

As shown in FIGS. 2, 3 and 4, the tape transport mechanism further includes a first idler roller means in the form of a pair of normally retracted idler rollers 54 and 55 on one side of the rotary drive member 46 and a second idler roller means in the form of a pair of normally retracted idler rollers 56 and 58 on the other side of the rotary drive member. As indicated in FIG. 2, the pair of idler rollers 54 and 55 is in the plane of the circumferential surfaces 38 and 42 of the two drive capstans 10 and 14 and are adapted for advance from their retracted positions to frictionally connect those two circumferential surfaces with the circumferential drive surface 48 of the rotary drive member 46. In like manner the pair of idler rollers 56 and 58 is in the second plane with the circumferential surfaces 36 and 44 of the two drive capstans to frictionally connect these two circumferential surfaces with the circumferential drive surface 48 of the rotary drive member 46.

It is apparent that with the pair of idler rollers 54 and 55 advanced from their retracted positions shown in FIG. 4 to their advanced positions shown in FIG. 3 and with the pair of idler rollers 56 and 58 retracted as shown in FIG. 3, and with the rotary drive member 46 rotating clockwise as indicated in FIG. 3, the two drive shafts 12 and 15 carrying the two capstans 10 and 14 will also rotate clockwise with the capstan 14 functioning as the leading capstan and the capstan 10 functioning as the trailing capstan. It is further apparent that with the idler roller 54 frictionally connecting the rotary drive member 46 with the large diameter circumferential surface 38 and with the idler roller 55 connecting the rotary drive member 46 with the small diameter circumferential drive surface 44, the leading capstan 14 will be rotated at a faster rate than the trailing capstan to place the rightwardly traveling tape under tension.

In like manner, with the pair of idler rollers 56 and 58 advanced from their retracted positions shown in FIG. 3 to their advanced positions shown in FIG. 4, with the pair of idler rollers 54 and 55 retracted as shown in FIG. 4, and with the rotary drive member 46 rotating counterclockwise as indicated in FIG. 4, the two drive shafts 12 and 15 of the two capstans will be driven counterclockwise with the capstan 10 functioning as the leading capstan and the capstan 14 functioning as the trailing capstan. It is further apparent that since the idler roller 56 frictionally connects the rotary drive member 46 with the small diameter surface 36 and the idler roller 58 connects the rotary drive member 46 with the large diameter circumferential surface 42, the leading capstan 10 will rotate at a faster rate that the trailing capstan 14 to maintain the tape under tension as it passes the transducer station 22.

In the presently preferred practice of the invention, the four idler rollers are mounted on corresponding solenoids. Thus the idler rollers 54 and 55 are mounted on the armatures 60 of a pair of solenoids 62 and 64 respectively and the idler rollers 56 and 58 are mounted on the armatures 60 of a pair of solenoids 65 and 66 respectively. Each of the four solenoids is normally de-energized and its armature 60 is normally held in a retracted position by a suitable spring 63.

The wiring diagram in FIG. 5 represents a control system that may be employed to operate the described tape transport mechanism. The control system includes a master control 70 in the form of a double-pole double-throw switch having an intermediate neutral position at which the motor 50 is de-energized with the two drive capstans 10 and 14 stationary. The master control 70 is connected to the two sides of the motor 50, and when it is moved from its neutral position in one direction to one of its two operating positions, it cooperates with a pair of contacts 72 and 74 that are connected to two leads 75 and 76 on the opposite sides of a direct current source (not shown) and thus drives the motor in one direction. The two contacts 72 and 74 are in series with the coil of a normally open relay 78 having a contactor 80. The contactor 80 is connected to the lead 75 and the associated relay contact 82 is connected to one side each of the two solenoids 62 and 64, the other sides of the two solenoids being connected to the lead 76.

In like manner, when the master control 70 is swung from its neutral position to its opposite operating position it cooperates with a pair of contacts 84 and 85 and places the contacts in series with the motor 50 to operate the motor in the reverse direction. The two contacts 84 and 85 are connected across the leads 75 and 76 in series with the coil of a normally open relay 86 having a contactor 88. The contactor 88 is connected to the lead 75 and the associated relay contact 90 is connected to one side of each of the two solenoids 65 and 66, the other sides of the two solenoids being connected to the lead 76.

When the master control 70 is swung to its left operating position, the parts of the tape transport mechanism are positioned as shown in FIG. 3, with the rotary drive member 46 rotating clockwise and with the two idler rollers 54 and 55 operatively connecting the rotary drive member with the two circular bodies 35 and 40 to drive the two capstans 10 and 14 clockwise with the leading capstan 14 rotating faster than the trailing capstan 10 to place the tape loop under tension. On the other hand, when the master control 70 is swung to its opposite limit position, the parts of the tape transport mechanism are positioned as shown in FIG. 4. The rotary drive member 46 is now reversed to rotate counterclockwise, and the two idler rollers 56 and 58 operatively connect the rotary drive member with the two circular bodies 35 and 40 to rotate the two drive capstans 10 and 14 counterclockwise, the leading capstan 10 now rotating faster than the trailing capstan 14 to place the tape loop under tension.

Figures 6, 7, 8:
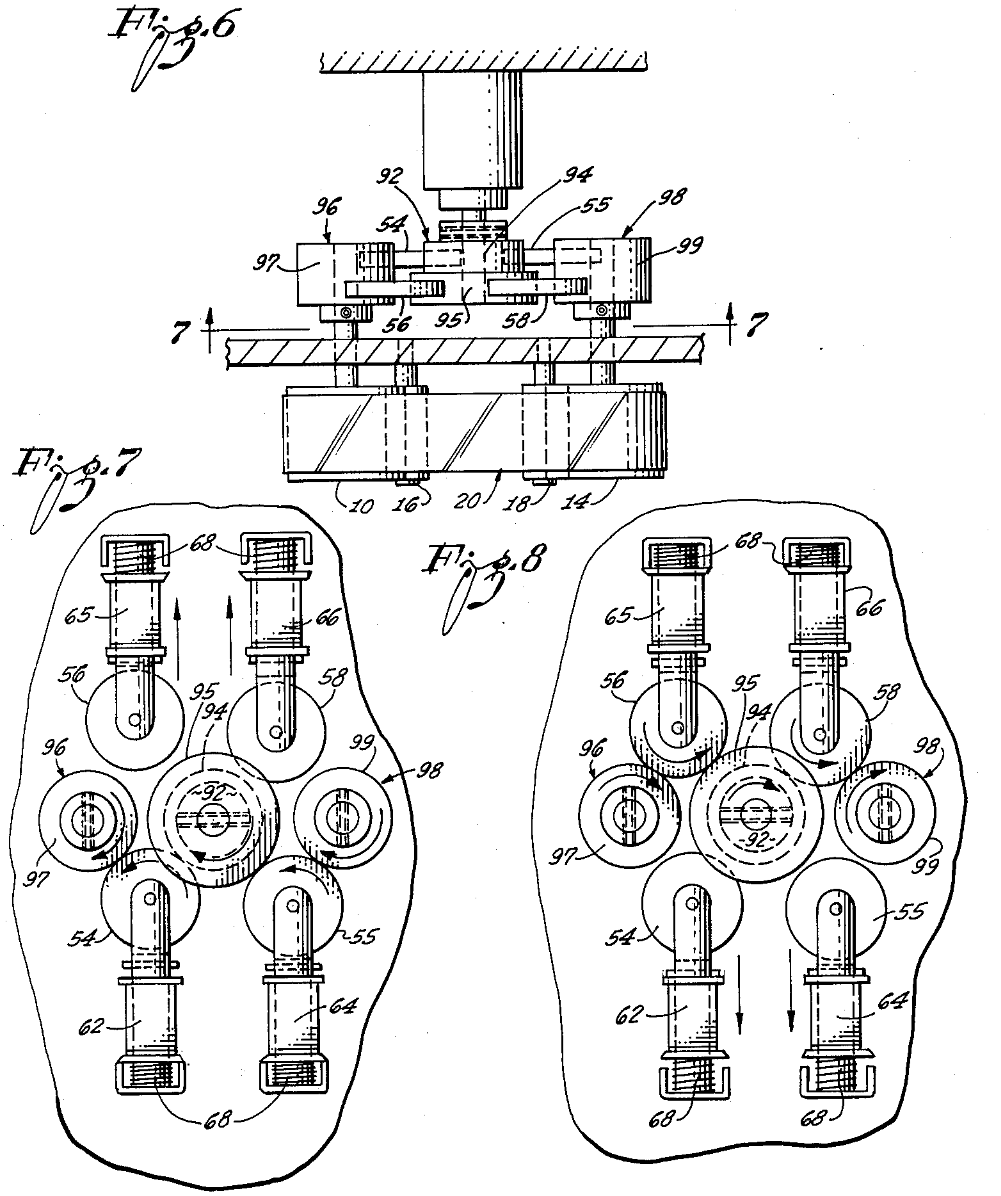
FIG. 6 is an elevational view similar to FIG. 2 showing another embodiment of the invention in which the differential circumferential surfaces of different diameters are on the rotary drive member instead of being on the two drive capstans.
FIG. 7 is a view, partly in section, as seen along the line 7—7 of FIG. 6 showing the mechanism of the second embodiment of the invention in operation to drive the tape in one direction.
FIG. 8 is a view similar to FIG. 7 showing the tape transport mechanism in operation to drive the tape in the opposite direction.

The second embodiment of the invention shown in FIGS. 6, 7 and 8 is largely identical with the first embodiment as indicated by the use of corresponding numerals to indicate corresponding parts. This second form of the invention differs in the construction of the rotary drive member and two associated circular bodies on the two drive shafts of the two capstans.

The rotary drive member 92 in FIG. 6 that is substituted for the previously described rotary drive member 46 has a circumferential drive surface 94 of relatively small diameter and an adjoining circumferential drive surface 95 of a relatively large diameter. The circular body 96 that is substituted for the circular body 35 has a single relatively wide circumferential drive surface 97 and in like manner the circular body 98 that is substituted for the previously described circular body 40 has a single relatively wide circumferential drive surface 99.

In FIG. 7, which corresponds to FIG. 3, the rotary drive member 92 rotates clockwise as indicated and the pair of idler rollers 54 and 55 transmit this clockwise rotation to the two circular bodies 96 and 98 that drive the two capstans 10 and 14. With the idler roller 55 operatively connecting the large diameter surface 95 of the rotary drive member 92 with the circular body 98 and with the idler roller 54 operatively conecting the smaller diameter surface 94 of the rotary drive member with the circular body 96, the two drive capstans 10 and 14 are driven clockwise with the leading capstan 14 rotating faster than the trailing capstan 10 to keep the tape loop under tension. In like manner, FIG. 8 shows how, with the rotary drive member 92 rotating counterclockwise and with the two solenoids 65 and 66 energized and the two solenoids 62 and 64 de-energized, the two drive capstans are driven clockwise with the leading capstan 10 rotating slightly faster than the trailing capstan 14 to place the tape loop under tension.

The third embodiment of the invention shown in FIGS. 9–12 differs from the first two embodiments of the invention in employing only two solenoid-actuated idler rollers instead of four idler rollers, the two idler rollers being used alternately for the two alternate directions of tape travel. The reduction in the number of solenoid-actuated idler rollers is accomplished by providing for each idler roller to make contact with three circumferential surfaces instead of only two circumferential surfaces.

In the embodiment of the invention shown in FIGS. 9–12, much of the structure is identical with the structure shown in FIGS. 2–4. Thus, the tape transport mechanism includes a first drive capstan 10 on a drive shaft 12 that is mounted by bearings 34 in a panel 32. The drive shaft 12 carries a circular body 35 having a circumferential drive surface 36 of relatively small diameter and a second adjacent circumferential drive surface 38 of larger diameter. In like manner, a second drive capstan 14 is mounted on a second drive shaft 15 that is journaled by a bearing 34 in the panel 32, and this second drive shaft carries a circular body 40 which has a circumferential drive surface 42 of relatively small diameter and a circumferential drive surface 44 of relatively large diameter. The small diameter circumferential drive surface 36 associated with the first drive capstan 10 is in the same plane as the larger diameter circumferential drive surface 44 associated with the second drive capstan 14. In like manner, the large diameter circumferential drive surface 38 associated with the first drive capstan 10 is in the same plane with the small diameter circumferential drive surface 42 associated with the second drive capstan 14.

Figures 9, 10, 11, 12:
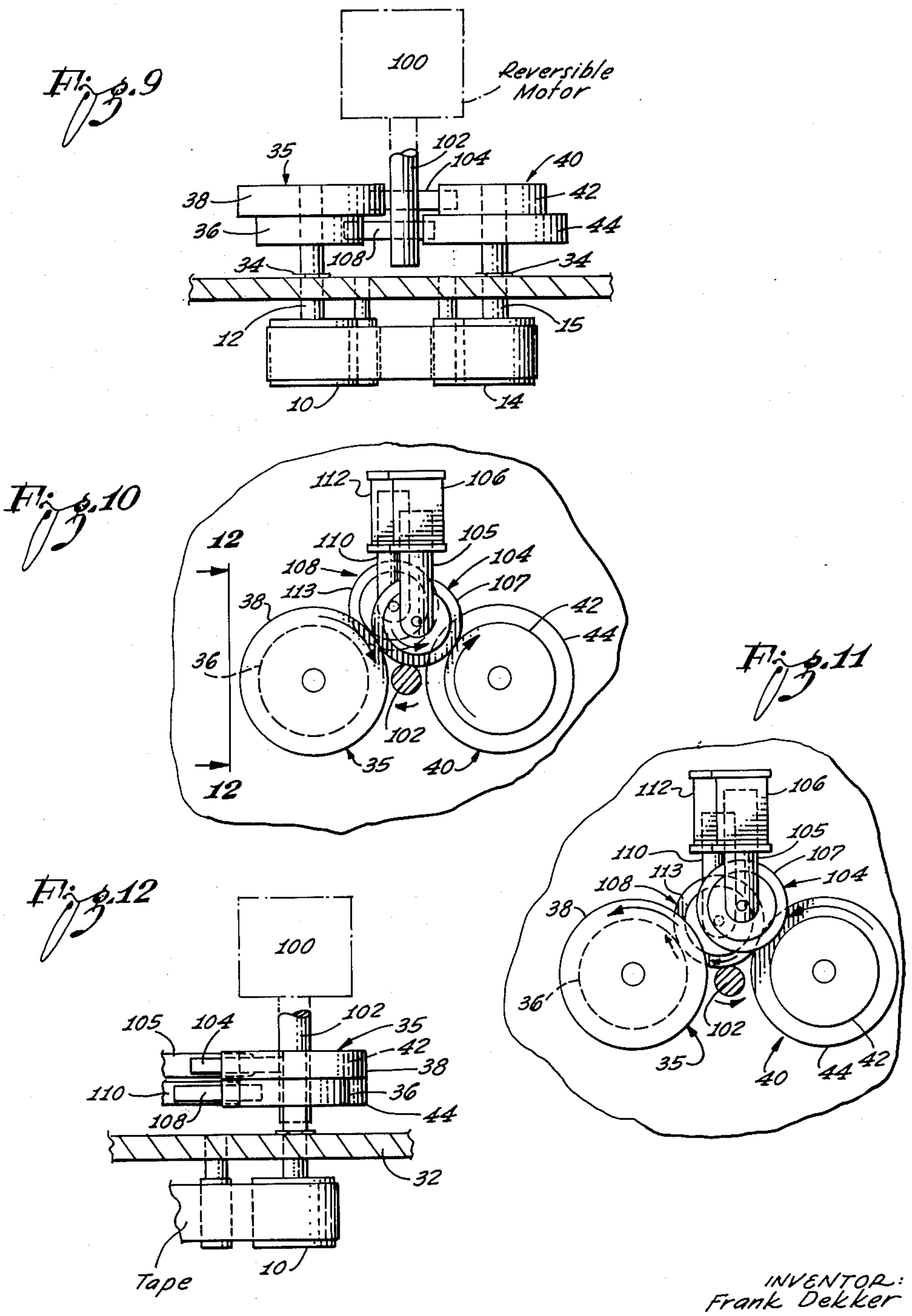
FIG. 9 is an elevational view similar to FIGS. 2 and 6 showing a third embodiment of the invention which employs only two solenoid-controlled idler rollers instead of four.
FIG. 10 is a view partly in section as seen along the line 10–10 of FIG. 9 showing the tape transport mechanism in operation to drive the tape in one direction.
FIG. 11 is a similar view showing the tape transport mechanism in operation to drive the tape in the opposite direction.
FIG. 12 is an elevational view as seen along the line 12–12 of FIG. 10.

For actuation of the tape transport mechanism, a suitable motor 100 has a drive shaft 102 positioned intermediate the two circular bodies 35 and 40, as shown in FIGS. 10 and 11. A first idler roller 104 carried by the armature 105 of a solenoid 106 is in the same plane as the two circumferential drive surfaces 38 and 40 and is normally retracted from the two drive surfaces. The idler roller has a circumferential yielding layer 107 made of a suitable elastomer. When the solenoid 106 is energized, the idler roller 104 is advanced from the retracted position shown in FIG. 11 to the advanced position shown in FIG. 10 and at its advanced position makes tangential contact with the two circumferential drive surfaces 38 and 40 and also with the motor shaft 102. It is apparent that in its advanced position the idler roller 104 operatively connects the motor shaft 102 to the two circular bodies 35 and 40 to drive the two capstans 10 and 14 clockwise with the capstan 14 operating at a greater peripheral speed than the capstan 10 to maintain the tape loop under tension.

A second idler roller 108 mounted on an armature 110 of a second solenoid 112 has a circumferential elastomeric layer 113 and is in the plane of the second pair of circumferential drive surfaces, i.e., the plane of the circumferential drive surfaces 36 and 44. When the solenoid 112 is de-energized, the second idler roller 108 is retracted, as indicated in FIG. 10; and when the solenoid is energized, the idler roller is advanced into contact with the two circumferential drive surfaces 36 and 44 and with the motor shaft 102, as shown in FIG. 11. At this advanced position of the second idler roller 108, it operatively connects the motor shaft 102 with the two circumferential drive surfaces 36 and 44; and with the motor shaft rotating clockwise, as indicated in FIG. 11, the two capstans 10 and 14 rotate counterclockwise, with the capstan 10 rotating at the greater peripheral speed to maintain the tape loop under tension.

The control circuit for the tape transport mechanism shown in FIGS. 9–12 is the same as the control circuit shown in FIG. 1, except that the solenoid 106 replaces the pair of solenoids 62 and 64 and the second solenoid 112 replaces the pair of solenoids 65 and 66.

My description in specific detail of the selected embodiments of the invention will suggest various changes, substitutions and other departures from my disclosure within the spirit and scope of the appended claims.

I claim:

1. In a tape transport system for reversibly driving a tape under tension past a transducer station, the combination of:

a first capstan having a peripheral surface of uniform diameter to engage the tape;

a second capstan having a peripheral surface of uniform diameter to engage the tape;

a reversible drive roller intermediate the two capstans;

a first pair of spaced circumferential surfaces on the drive roller and on the first capstan respectively for use in driving the first capstan at a given peripheral speed;

a second pair of spaced circumferential surfaces on the drive roller and the first capstan respectively for use in driving the first capstan at a lower peripheral speed;

a third pair of spaced circumferential surfaces on the drive roller and the second capstan respectively for use in driving the second capstan at a given peripheral speed;

a fourth pair of spaced circumferential surfaces on the drive roller and the second capstan respectively to drive the second capstan at a lower peripheral speed;

first retractable idler roller means to frictionally interconnect said first and fourth pairs of spaced circumferential surfaces to drive the first capstan at the given peripheral speed and to drive the second cap stan at the lower peripheral speed; and a second retractable idler roller means to frictionally interconnect said second and third pairs of spaced given peripheral speed and to drive the second capstan at the given speed and drive the first capstan at a lower speed.

2. A combination as set forth in claim 1 in which each of said first and second idler roller means comprises two solenoid-controlled idler rollers.

3. A combination as set forth in claim 1 in which each of said two capstans has two circumferential surfaces of different diameters to cooperate with the idler roller means.

4. A combination as set forth in claim 1 in which said drive roller has two circumferential surfaces of different diameters to cooperate with the idler roller means.

5. In a tape transport system for reversibly driving a tape under tension past a transducer station, the combination of:

a first capstan for peripheral engagement with the tape on one side of the transducer station;

a first small diameter circumferential drive surface and a first large diameter circumferential drive surface operatively connected to said first capstan;

a second capstan for peripheral engagement with the tape on the other side of the transducer station;

a second small diameter circumferential drive surface and a second large diameter circumferential drive surface operatively connected to said second capstan;

a reversible drive member;

a first frictional transmission means operative for frictionally connecting the periphery of the drive member with the first small diameter circumferential surface and the second large diameter circumferential surface to drive the first capstan and the second capstan with the first capstan operating at a higher peripheral speed than the second capstan; and a second alternate frictional transmission means operative for frictionally connecting the periphery of the drive member with the first large diameter circumferential surface and the second small diameter circumferential surface to drive the two capstans with the second capstan operating at a higher peripheral speed than the first capstan.

6. A combination as set forth in claim 5 in which said two first circumferential surfaces are united with the first capstan concentrically thereof and the two second circumferential surfaces are united with the second capstan concentrically thereof.

7. In a tape transport system for reversibly driving a tape under tension past a transducer station, the combination of:

a first capstan for peripheral engagement with the tape on one side of the transducer station;

a first small diameter circumferential drive surface and a first large diameter circumferential drive surface operatively connected to said first capstan;

a second capstan for peripheral engagement with the tape on the other side of the transducer station;

a second small diameter circumferential drive surface and a second large diameter drive surface operatively connected to said second capstan;

a rotary drive member;

master control means having a neutral position, a first operating position, and a second operating position;

reversible power means operatively connected to said rotary drive member for actuation thereof, said power means being de-energized at the neutral position of the master control and operating in opposite directions in response to the first and second operating positions respectively, of the master control;

a first normally inoperative frictional transmission means operative in response to said first operating position of the master control to frictionally connect said rotary drive member with said first small diameter circumferential drive surface and said second large diameter circumferential drive surface; and a second normally inoperative frictional transmission means operative in response to said second operating position of the master control to frictionally connect said rotary drive member with said first large diameter circumferential drive surface and said second small diameter circumferential drive surface.

8. In a tape transport system for reversibly driving a tape under tension past a transducer station, the combination of:

a first capstan for peripheral engagement with the tape on one side of the transducer station;

a first small diameter circumferential drive surface and a first large diameter circumferential drive surface operatively connected to said first capstan;

a second capstan for peripheral engagement with the tape on the other side of the transducer station;

a second small diameter circumferential drive surface and a second large diameter circumferential drive surface operatively connected to said second capstan;

a reversible rotary drive member;

a first pair of normally retracted idler rollers;

a first control means to extend said idler rollers to frictionally connect said drive member with said first small diameter circumferential drive surface and said second large diameter circumferential drive surface respectively;

a second pair of normally retracted idler rollers; and a second control means to extend said second pair of idler rollers to frictionally connect said drive member with said first large diameter circumferential drive surface and said second small diameter circumferential drive surface.

9. A combination as set forth in claim 8 which includes:

a master control having a neutral position and two operating positions;

a normally de-energized reversible motor to actuate said rotary drive member said motor being de-energized at the neutral position of the master control, said motor being energized in opposite directions at the two opposite operating positions respectively of the master control;

said first control means being responsive to movement of the master control to one of its two operating positions and said second control means being responsive to movement of the master control to the other of its two operating positions.

10. In a tape transport system for reversibly driving a tape under tension past a transducer station, the combination of:

a first capstan having a tape-engaging peripheral surface, a concentric small diameter circumferential drive surface and a concentric large diameter circumferential drive surface;

a second capstan having a tape-engaging peripheral surface, a concentric small diameter circumferential drive surface and a concentric large diameter circumferential drive surface;

first idler roller means operable to operatively connect the rotary drive member to the small diameter drive surface of the first capstan and the large diameter drive surface of the second capstan to drive the tape in one direction under tension; and second idler roller means operable to operatively connect the rotary drive member to the small diameter drive surface of the second capstan and the large diameter drive surface of the first capstan to drive the tape in the opposite direction under tension.

11. In a tape transport system for reversibly driving a tape under tension past a transducer station, the combination of:

first and second spaced capstans having peripheral surfaces of uniform diameter to engage the tape and having parallel axes;

the first of said capstans having a small diameter concentric circumferential drive surface in a first plane perpendicular to the two axes and a second large diameter concentric circumferential drive surface in a second plane perpendicular to the two axes;

the second of said two capstans having a large diameter concentric circumferential drive surface in the first plane and a second small diameter concentric circumferential drive surface in the second plane;

a reversible drive member intermediate the two capstans on a third axis parallel to the two axes and having a circumferential drive surface in both of said planes;

a first pair of idler rollers in said first plane movable from retracted positions to operatively connect said circumferential drive surface of the drive member with the circumferential surfaces of the two capstans in the first plane to rotate the first capstan faster than the second capstan;

a second pair of idler rollers in said second plane movable from retracted positions to operatively connect said circumferential drive surface of the drive member with the circumferential surfaces of the two capstans in the second plane to rotate the second capstan faster than the first capstan; and remote control means to control said drive member and to advance said pairs of idler rollers selectively.

12. A combination as set forth in claim 11 in which said remote control means includes a first circuit to drive said motor in one direction and advance one of said pairs of idler rollers and a second circuit to drive said motor in the opposite direction and to advance the other of said pairs of idler rollers.

13. In a tape transport system for reversibly driving a tape under tension past a transducer station, the combination of:

a first capstan for peripheral engagement with the tape on one side of the transducer station;

a first small diameter circumferential drive surface and a first large diameter circumferential drive surface operatively connected to said first capstan;

a second capstan for peripheral engagement with the tape on the other side of the transducer station;

a second small diameter circumferential drive surface and a second large diameter circumferential drive surface operatively connected to said second capstan;

a reversible rotary drive member;

a first normally retracted idler roller;

means to advance said first idler roller into simultaneous contact with said drive member and both said first small diameter circumferential drive surface and said second large diameter circumferential drive surface;

a second normally retracted idler roller; and means to advance said second idler roller into simultaneous contact with said drive member and with both said first large diameter circumferential drive surface and said second small diameter circumferential drive surface.

14. A combination as set forth in claim 13 which includes:

a master control having a neutral position and two operating positions;

a normally de-energized reversible motor to actuate said rotary drive member, said motor being de-energized at the neutral position of the master control, said motor being energized in opposite directions at the two opposite operating positions respectively of the master control.

the means to advance the first idler roller being responsive to movement of the master control to one of its two operating positions and the means to advance the second idler roller being responsive to movement of the master control to the other of its two operating positions.

References Cited by the Examiner

UNITED STATES PATENTS

| | | | |
|---|---|---|---|
| 2,335,277 | 11/43 | Heller | 242—55.12 |
| 2,528,061 | 10/50 | Knapp | 242—54.1 |
| 2,675,185 | 4/54 | Zenner | 242—54.1 |
| 2,913,192 | 11/59 | Mullin | 242—55.11 |
| 3,099,376 | 7/63 | Kennedy | 226—108 |

ROBERT B. REEVES, *Acting Primary Examiner.*

RAPHAEL M. LUPO, *Examiner.*